June 14, 1966  J. A. JERDON  3,255,520

AUTOMOBILE TIRE STEM REMOVING AND/OR INSERTING TOOL

Filed July 21, 1964

INVENTOR.
James A. Jerdon
BY
Fulwider, Patton, Rieber, Lee & Utecht ly United States Patent Office 3,255,520
Patented June 14, 1966

3,255,520
AUTOMOBILE TIRE STEM REMOVING AND/OR
INSERTING TOOL
James A. Jerdon, 5077-A Santa Monica Ave.,
San Diego, Calif. 92107
Filed July 21, 1964, Ser. No. 384,168
2 Claims. (Cl. 29—221.5)

The present invention relates to an automobile tire stem removing and/or inserting tool.

The device utilizes an internally threaded member for engaging the threads on the end of a valve stem. A threaded rod is rotatably connected to said member, the longitudinal axis of the rod being coincident with the axis of rotation of the threads of the member.

A lever is used in conjunction with the rod to pull the stem out of the rim of the wheel. The lever comprises a pivot engageable with the rim of the wheel, a lifting portion extending from said pivot toward the valve stem, and a handle portion extending from the pivot and away from the stem. The lifting portion has holes through which the rod may pass.

A threaded wing nut is screwed on the end of the rod which protrudes through one of the holes. The wing nut may be tightened to the point where it bears on the lifting portion of the lever.

Other features and advantages of the present invention will be apparent from the following description, reference being made to the accompanying drawing wherein a preferred embodiment of the invention is illustrated.

Figure 1:
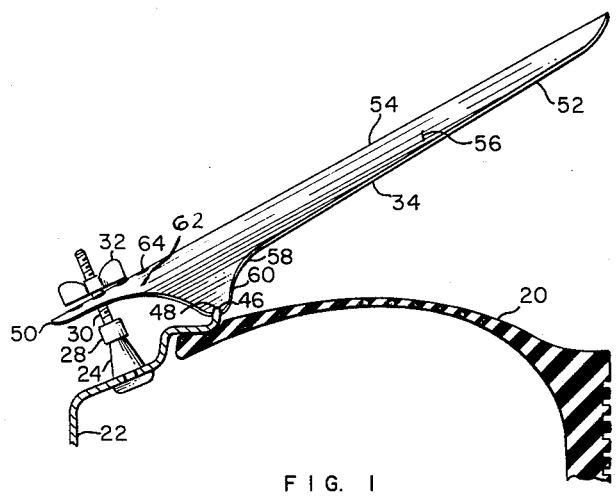
FIG. 1 is a side view of the tool and fragmentary view of a cross section of an automobile wheel in the vicinity of its stem.
Figure 2:
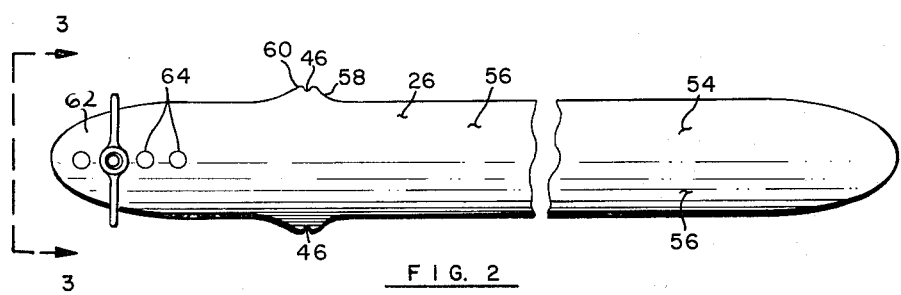
FIG. 2 is a top plan view of the tool.
Figure 3:
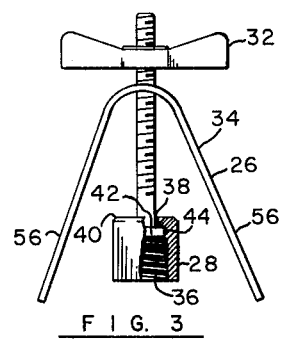
FIG. 3 is an end view of the tool taken along line 3—3 of FIG. 2.

FIG. 1 shows a cross section of tire 20 and wheel rim 22 and elevations of valve stem 24 and tool 26.

The tool is comprised of a member 28, a threaded rod 30, a wing nut 32 and a lever 34. Member 28 is internally threaded, as at 36, so that member 28 may be screwed onto the end of valve stem 24.

Threaded rod 30 protrudes through hole 38 in the top 40 of member 28, said hole having a diameter slightly larger than the diameter of the threaded rod 30. The inner end 42 of threaded rod 30 having a shoulder 44 which prevents the inner end 42 from passing through hole 38. Shoulder 44 is located interiorly of member 28. When member 28 is screwed on valve stem 24, the threaded rod 30 protrudes from the top of said member and has its longitudinal axis coincident the extended longitudinal axis of valve stem 24.

Lever 34 is used in conjunction with rod 30 and member 28 to pull valve stem 24 out of rim 22. Lever 34 comprises a pivot 46 engageable with the outer edge 48 of rim 22, a lifting portion 50 extending from pivot 46 toward valve stem 24, and a handle portion 52 extending from pivot 46 and away from valve stem 24.

Lever 34 is constructed of a metal plate 54 whose plan form is symmetric with respect to the longitudinal axis of lever 34. Metal plate 54 is bent to channel shaped form, i.e. U-shaped in cross section, which has a plan form which is symmetric with respect to the longitudinal axis of lever 34. When lever 34 is in working position on a wheel which is lying in a horizontal plane, the side walls 56 of lever 34 extend downwardly. A portion of each side wall 56 extends down more than the rest of the side wall so as to form two wings 58. The lower end 60 of each wing 58 has a notch which forms a pivot 46 which is engageable with the outer edge 48 of rim 22.

The top surface 62 of lifting portion 50 has holes 64 through which the threaded rod 30 may extend.

The following sequence is followed in order to remove stem 24 with tool 26. Member 28 with its protruding threaded rod 30 is screwed onto the end of valve stem 24. The threaded rod 30 is then inserted through one of holes 64 and pivots 46 are then engaged with the outer edge 48 of rim 22. A wing nut 32 is then screwed on the end of threaded rod 30 and is tightened until it bears on the top surface 62 of the tool 26. The lever portion 52 is pushed on so as to produce an upward and outward force on the threaded rod 30 and valve stem 24.

From the above description it is seen that the tool can be used to quickly and easily remove valve stems. Prior to this invention valve stems were very difficult to remove.

While the form of embodiment herein shown and described constitutes a preferred form, it is understood that other forms may be adopted falling within the scope of the claims that follow.

I claim:

1. A device used to remove tire valve stems from the wheels used on tubeless tires, said device comprising in combination:
   (A) an internally threaded member for engaging the threads on the end of said valve stem;
   (B) a threaded rod which is rotatably connected to said member, the longitudinal axis of said rod being coincident with the axis of rotation of the threads of said member;
   (C) a lever comprising:
      (1) pivotal means engageable with the rim of said wheel;
      (2) a lifting portion extending from said pivotal means toward said valve stem, said lifting portion having at least one hole through which said rod passes, said hole having a diameter at least as large as the diameter of said rod;
      (3) a handle portion extending from said pivotal means and away from said stem;
   (D) a threaded wing nut which is screwed on said rod at the end which protrudes from said hole, said wing nut may be positioned on said rod so as to abut the surface of the lifting portion, said surface being adjacent said hole.

2. A device as defined in claim 1, characterized in that said lever comprises a sheet of metal, U-shaped in cross-section to form two side walls, and includes:
   (4) integrally formed wings extending downwardly from each side wall, the lower ends of said wings being notched to form the pivots of the lever.

No references cited.

WILLIAM FELDMAN, *Primary Examiner.*

J. C. PETERS, *Assistant Examiner.*